(12) United States Patent
Robert et al.

(10) Patent No.: US 10,844,624 B2
(45) Date of Patent: Nov. 24, 2020

(54) ENCLOSURE AND A SILENT DOOR THEREFOR

(71) Applicant: Plano Molding Company, Plano, IL (US)

(72) Inventors: Jay Robert, Star, ID (US); Ryan Kubica, Saint Charles, IL (US)

(73) Assignee: PLANO MOLDING COMPANY, LLC, Plano, IL (US)

( * ) Notice: Subject to any disclaimer, the term of this patent is extended or adjusted under 35 U.S.C. 154(b) by 0 days.

(21) Appl. No.: 16/139,407

(22) Filed: Sep. 24, 2018

(65) Prior Publication Data
US 2019/0093383 A1    Mar. 28, 2019

Related U.S. Application Data

(60) Provisional application No. 62/564,036, filed on Sep. 27, 2017.

(51) Int. Cl.
| | |
|---|---|
| *E04H 15/00* | (2006.01) |
| *E04H 15/44* | (2006.01) |
| *E04H 15/02* | (2006.01) |
| *E04H 15/64* | (2006.01) |
| *A01M 31/02* | (2006.01) |
| *E04H 15/54* | (2006.01) |

(52) U.S. Cl.
CPC ........... *E04H 15/02* (2013.01); *A01M 31/025* (2013.01); *E04H 15/001* (2013.01); *E04H 15/44* (2013.01); *E04H 15/642* (2013.01); *E04H 15/54* (2013.01)

(58) Field of Classification Search
CPC ....... E04H 15/001; E04H 15/44; E04H 15/54; E04H 15/58
See application file for complete search history.

(56) References Cited

U.S. PATENT DOCUMENTS

| | | | | |
|---|---|---|---|---|
| 4,265,261 | A * | 5/1981 | Barker | E04H 15/24 135/100 |
| 7,320,332 | B2 * | 1/2008 | Reis | E04H 15/44 135/115 |
| 8,387,642 | B2 * | 3/2013 | Ball | E04H 15/322 135/117 |
| 8,915,258 | B1 * | 12/2014 | Beam | E04H 15/001 135/117 |
| 9,238,924 | B2 * | 1/2016 | Wyant | E04H 15/001 |
| 9,273,484 | B2 * | 3/2016 | Rowley | E04H 15/48 |
| 9,512,632 | B2 * | 12/2016 | Cook | E04H 15/54 |
| 9,834,953 | B2 * | 12/2017 | Ways | E04H 15/425 |

(Continued)

*Primary Examiner* — Noah Chandler Hawk
(74) *Attorney, Agent, or Firm* — Leason Ellis LLP

(57) ABSTRACT

An enclosure having an opening that allows access to a space formed by the enclosure, a door that covers the opening, wherein the door includes a pair of rigid edges, and a vertical living hinge that attaches the door to a portion of the enclosure. The enclosure may have a horizontal living hinge that allows the pair of rigid edges to fold with respect to each other. The door may have a plurality of stiffening members to form the pair of rigid edges. The enclosure may have a plurality of stiffening members in the enclosure wall, located proximate to the opening. The plurality of stiffening members in the enclosure wall may be positioned to substantially align with the plurality of stiffening members in the door, so as to cover the opening and form a seal between the door and the enclosure.

20 Claims, 4 Drawing Sheets

(56) References Cited

U.S. PATENT DOCUMENTS

| | | | | |
|---|---|---|---|---|
| 9,976,318 | B2* | 5/2018 | Lynch | E04H 15/40 |
| 2006/0169309 | A1* | 8/2006 | Brackins | E04H 15/001 |
| | | | | 135/119 |
| 2008/0083443 | A1* | 4/2008 | Eastman, II | E04H 15/001 |
| | | | | 135/121 |
| 2011/0168221 | A1* | 7/2011 | Schlipf | E04H 15/001 |
| | | | | 135/143 |
| 2013/0061896 | A1* | 3/2013 | Webster | E04H 15/14 |
| | | | | 135/93 |
| 2013/0306121 | A1* | 11/2013 | Hung Lau | A01M 31/025 |
| | | | | 135/117 |
| 2016/0289995 | A1* | 10/2016 | Schneider | E04H 15/001 |
| 2017/0234028 | A1* | 8/2017 | LaHood | E04H 15/48 |
| | | | | 135/152 |
| 2018/0058090 | A1 | 3/2018 | Kubica | |

* cited by examiner

ENCLOSURE AND A SILENT DOOR THEREFOR

CROSS REFERENCE TO RELATED APPLICATION

This application claims priority to and the benefit of U.S. Provisional Patent Application No. 62/564,036, entitled "Silent Door Entry to Hunting Enclosures, Ice Shelters and All Hub Style Camping Enclosures," filed Sep. 27, 2017, which is incorporated herein by reference in its entirety.

FIELD OF THE DISCLOSURE

The disclosure relates generally to rapidly deployable enclosures such as tents, ground blinds, hunting enclosures, ice fishing shelters, hub-style camping enclosures, or the like (hereinafter referred to as "enclosure"). More particularly, it relates to a silent door or cover to an enclosure, and a novel fastener device for the same.

BACKGROUND OF THE DISCLOSURE

Hub shelters are very popular in the hunting industry as well as the ice fishing industry. They are now starting to be used for camping tents. Hub shelters may comprise 2 or more hubs with 4 poles attached to each hub to support a fabric tent. An issue with these hub shelters is the door zippers may fail and are noisy to open and close. Currently most hub shelters use zippers, Velcro, or snaps to tightly close the entry door. An unfulfilled need exits for a very easy way to get in and out of an enclosure (e.g., a blind, a tent, hunting enclosure, fishing shelter, or the like) with little or no noise or chance of a failed zipper, Velcro or snap.

SUMMARY OF THE DISCLOSURE

A silent door, cover, closure, or the like (hereinafter referred to as "door") feature is disclosed herein that creates extremely quiet entry (or opening) and exit (or closure) with no chance of failure.

According to an aspect of the disclosure, a door to an entry or to an opening for use in enclosures is disclosed herein. The door is configured to securely fasten to the enclosure and to partially or entirely cover an opening in the enclosure. The door comprises a fastener device that fastens the door to the enclosure without any zippers, Velcro, or other noisy fasteners. The fastener device may comprise a living hinge.

The door may include a stiffening material in, for example, one or more (preferably two or more) outer edges of the door. The enclosure may include stiffening materials on two or more outer edges so when the door closes the stiffening materials overlap each other, thereby creating a tight seal.

The door may comprise a fabric material that is reinforced and stiffened along the edges. The door may be configured to collapse into the enclosure for compact storage, and expanded when the enclosure is erected for use. When a user expands/erects the enclosure (e.g., a blind), the door may automatically unfold itself into the correct position. The instant disclosure allows users to enter and exit the enclosure easily with no noise.

According to a non-limiting embodiment, a deployable enclosure is provided that deploys to form a space, wherein deployable enclosure may comprise: a plurality of wall panels; an opening in a portion of one of the plurality of wall panels, the opening allowing access to the space formed by the enclosure; a door that covers the opening, the door having a pair of rigid edges and a horizontal living hinge; and a vertical living hinge that attaches the door to the enclosure. The enclosure may further comprise a plurality of stiffening members in said one of the plurality of wall panels, wherein the plurality of stiffening members are located proximate to the opening.

The door may comprise a plurality of stiffening members that form the pair of rigid edges. The plurality of stiffening members in the door may be positioned to substantially align with the plurality of stiffening members in the one of the plurality of wall panels to cover the opening and form a seal between the door and the one of the plurality of wall panels when the door is in a closed position.

The deployable enclosure may further comprise a fastener device that secures the door to the one of the plurality of wall panels in a closed position. The fastener device may comprise a hook device and a receiver device. The hook device may attach and secure to the receiver device to secure the door to the one of the plurality of wall panels. The hook device may comprise a door attachment portion and an attachment member. The door attachment portion may comprise a horizontal living hinge. The attachment member may comprise a hook portion that may attach and secure to the receiver device.

According to a non-limiting embodiment, a silent door is provided for covering an opening in an enclosure that allows access to a space formed by the enclosure. The silent door may comprise: a pair of rigid edges; a vertical living hinge that attaches the door to a portion of the enclosure; and, a horizontal living hinge that allows the pair of rigid edges to fold with respect to each other. The door may further comprise a hook device that may attach to a receiver device located on a wall panel in the enclosure.

Additional features, advantages, and embodiments of the disclosure may be set forth or apparent from consideration of the following detailed description and drawings. Moreover, it is noted that both the foregoing summary of the disclosure and the following detailed description are exemplary and intended to provide further explanation without limiting the scope of the disclosure.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

Figure 1:
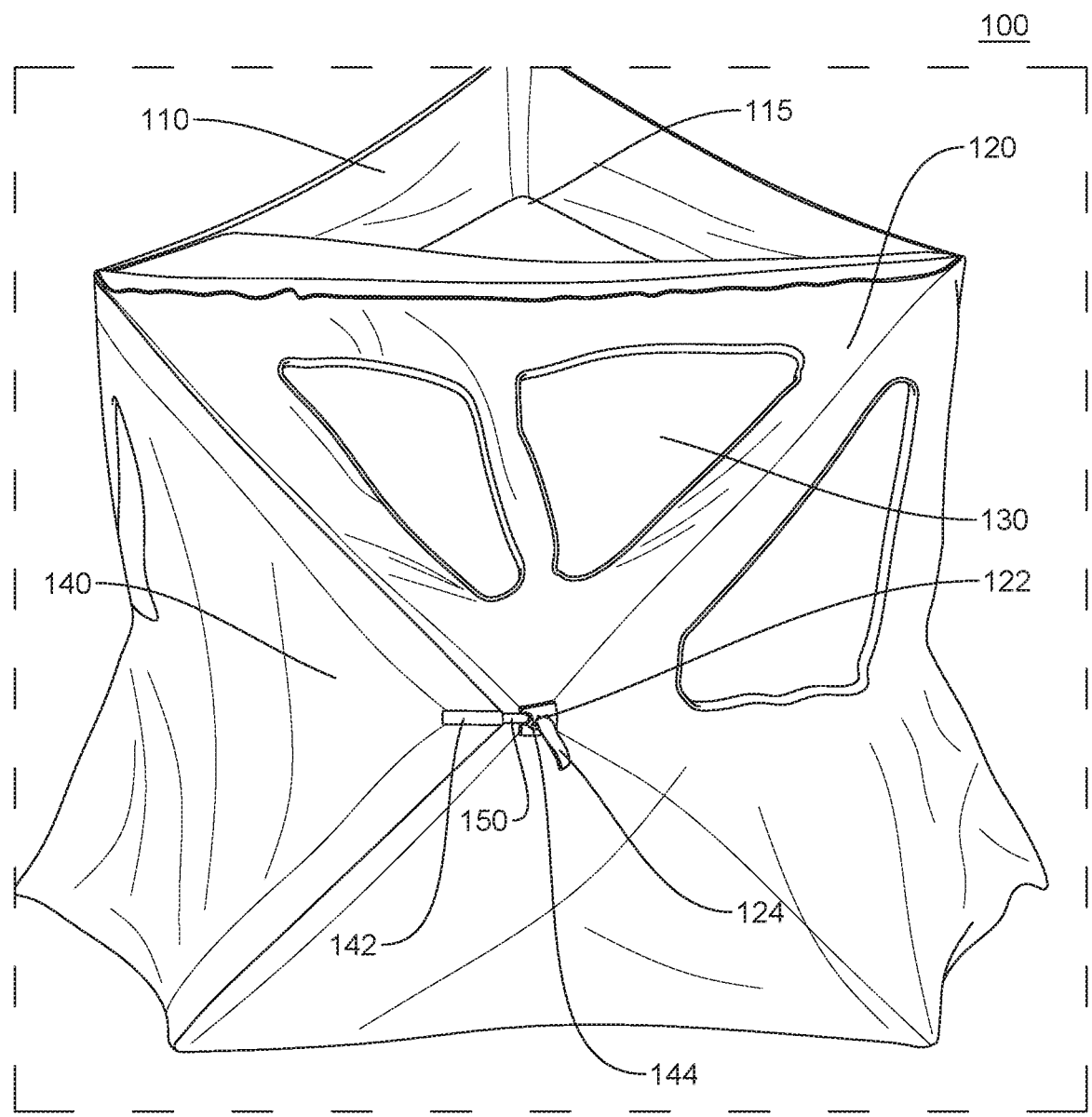
FIG. 1 shows an example of an enclosure according to an embodiment of the disclosure.

The present disclosure is further described in the detailed description and drawings that follows.

DETAILED DESCRIPTION OF THE DISCLOSURE

The embodiments of the disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

FIG. 1 shows an example of an enclosure 100, constructed according to the principles of the disclosure. As seen in FIG. 1, the enclosure 100 may comprise one or more roof panels 110 and/or one or more wall panels 120. The enclosure 100 may comprise a floor (not shown). The enclosure 100 may include one or more openings 130, which may be formed in one or more wall panels 120, and which may be coverable by one or more corresponding opening covers to shield the internal space from the elements. The enclosure 100 may comprise a door 140. The enclosure 100 may include a fastener device 150 that allows for fastening and securement from inside or outside of the enclosure 100. As seen in FIG. 1, the door 140 can be closed and fastened from inside the enclosure 100.

Figure 2:
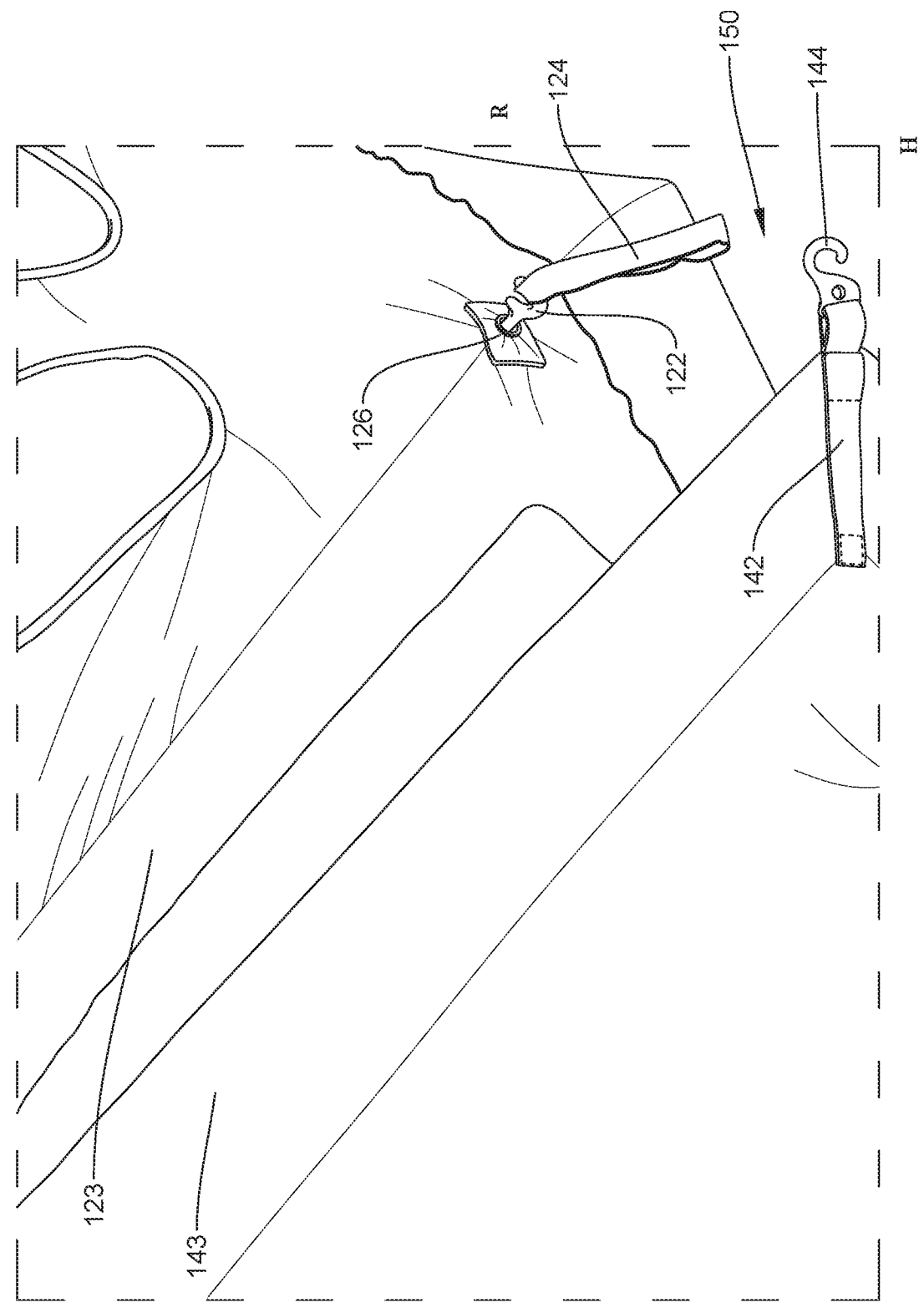
FIG. 2 shows an enlarged view of a portion of the enclosure of FIG. 1.

FIG. 2 shows an enlarged view of a portion of the enclosure 100, including the fastener device 150 and a portion of the door 140, shown in a partially open configuration. As seen in FIG. 2, the fastener device 150 may comprise an external hook device H and an external receiver device R. The external hook device H is configured to attach to and securely engage the external receiver device R without making any noise that might be heard by, for example, an animal within a predetermined distance of the enclosure 100 (e.g., 10 feet, or more from the enclosure).

The external hook device H may include a door attachment portion 142 and an attachment member 144. The door attachment portion 142 may include, for example, a strap attached to or integrally formed with the door 140. The strap may be attached to the door 140 by a fastening mechanism. The strap may be made of a material such as, for example, cloth, leather, plastic, metal, or the like. The strap may be configured so as to form a horizontal living hinge to allow the edges of the door 140 to fold with respect to each other.

The attachment member 144 may include, for example, a hook, a pin, or any other device that can silently attach to and securely engage the counter attachment member 122 to securely fasten the attachment member 144 to the counter attachment member 122. The attachment member 144 may be attached to or integrally formed with the door attachment portion 142. The attachment member 144 may be attached to the door attachment portion 142 by means of an attachment mechanism.

The external receiver device R may include a panel attachment portion 126 and a counter attachment member 122. The external receiver device R may include a handle 124. The panel attachment portion 126 may include a strong and durable material that can withstand forces applied to the panel attachment portion 126 over an extend periods of time, such as, for example, when pulling forces are exerted on and conveyed from the handle 124 during deployment of the enclosure and/or attachment and securement of the hook device H to the receiver device R. The panel attachment portion 126 may be attached to or integrally formed with the enclosure 100. The panel attachment portion 126 may be attached to the enclosure 100 by an attachment mechanism.

The counter attachment member 122 may include a rod portion and a handle attachment portion. The rod portion may have a width or diameter that is significantly smaller than a width or diameter of the handle attachment portion, respectively. The rod portion may be formed as an elongated cylindrical or rod structure. The handle attachment portion may be formed as a spherical or circular structure. It is noted that the rod portion and handle attachment portion may have any shape or size that facilitates attachment of the attachment member 144, with the handle attachment portion functioning as a stop to prevent the attachment member 144 from slippingly detaching from the rod portion. The handle 124 may be attached to, or integrally formed with the handle attachment portion.

The counter attachment member 122 and panel attachment portion 126 may be attached to each other by means of an attachment mechanism, or formed integrally as a single piece.

Referring to FIGS. 1 and 2, a user may close and secure the door 140 to the enclosure 100 by, for example, grasping and holding the handle 124 with one hand while simultaneously grasping and moving the external attachment member 144 toward the external counter attachment member 122 (and the handle 124) with the other hand. The user may then fasten the external attachment member 144 to the external counter attachment member 122 by, for example, aligning an opening in the external attachment member 144 and catching an engaging portion (e.g., the rod portion, shown in FIG. 2) of the external counter attachment member 122, according to a non-limiting embodiment of the fastener device 150.

The enclosure 100 may comprise an internal fastener device (not shown). The internal fastener device (not shown) may be constructed to be substantially the same as the fastener device 150. The internal fastener device (not shown) may include an internal hook device H (not shown) and an internal receiver device R (not shown), which may be substantially the same as the external hook device H and external receiver device R, respectively.

The internal receiver device R may be formed separately from, or integrally with the external receiver device R. Alternatively, internal receiver device R may be formed separately from, or integrally with the external hook device H. The internal receiver device R may be located on an inner portion of a wall panel 120 that is substantially opposite the location of the external receiver device R, which may be provided on the outer portion of the wall panel 120 of the enclosure 100. In other words, the internal and external receiver devices R may be collocated on opposite sides of the wall panel 120.

The internal hook device H may be formed separately from, or integrally with the external hook device H. Alternatively, internal hook device H may be formed separately from, or integrally with the external receiver device R. The internal hook device H may be located on an inner portion of the door 140 that is substantially opposite the location of the external hook device H, which may be provided on the outer portion of the door 140. In other words, the internal and external hook devices H may be collocated on opposite sides of the door 140.

Although the hook device H is shown as being attached to the door 140, and the receiver device R is shown as being attached to the wall panel 120, these portions may be reversed so that the hook device H is provided on the wall panel 120 and the receiver device R is provided on the door 140, as discussed above.

It is noted that according to a non-limiting embodiment of the fastener device 150, the receiver device R may comprise two hook portions (not shown), each one being similar to the attachment member 144. The two hook portions may be provided in place of, or in addition to the counter attachment member 122.

Referring to FIG. 2, the door 140 may include one or more stiffening members 143 (or a stiffening material) to render the door 140 stiff on one, two, or more of its edges. The stiffening member 143 may comprise, for example, a rod, a pole, a longitudinal plate, a bar, or the like, made of a rigid material such as, for example, carbon-fiber, fiberglass, plastic, metal, or the like. The stiffening member 143 may include a magnetic material. The stiffening member(s) 143 may be covered by the outer material 127 and/or embedded between the inner material 125 and the outer material 127 (shown in FIG. 4).

Figure 3:
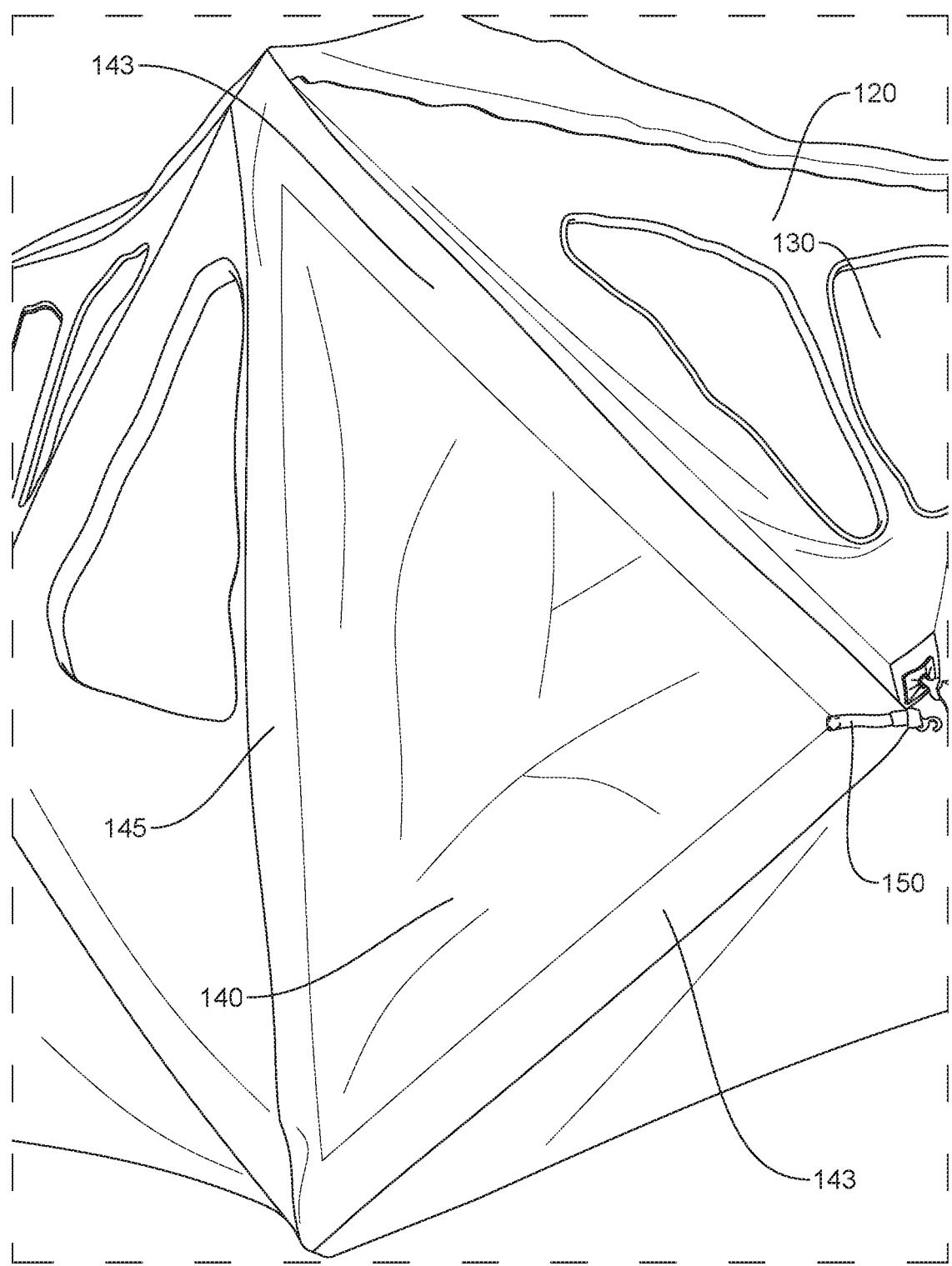
FIG. 3 shows an enlarged view of a portion of the enclosure of FIG. 1, with an example of a door in a closed configuration.
Figure 4:
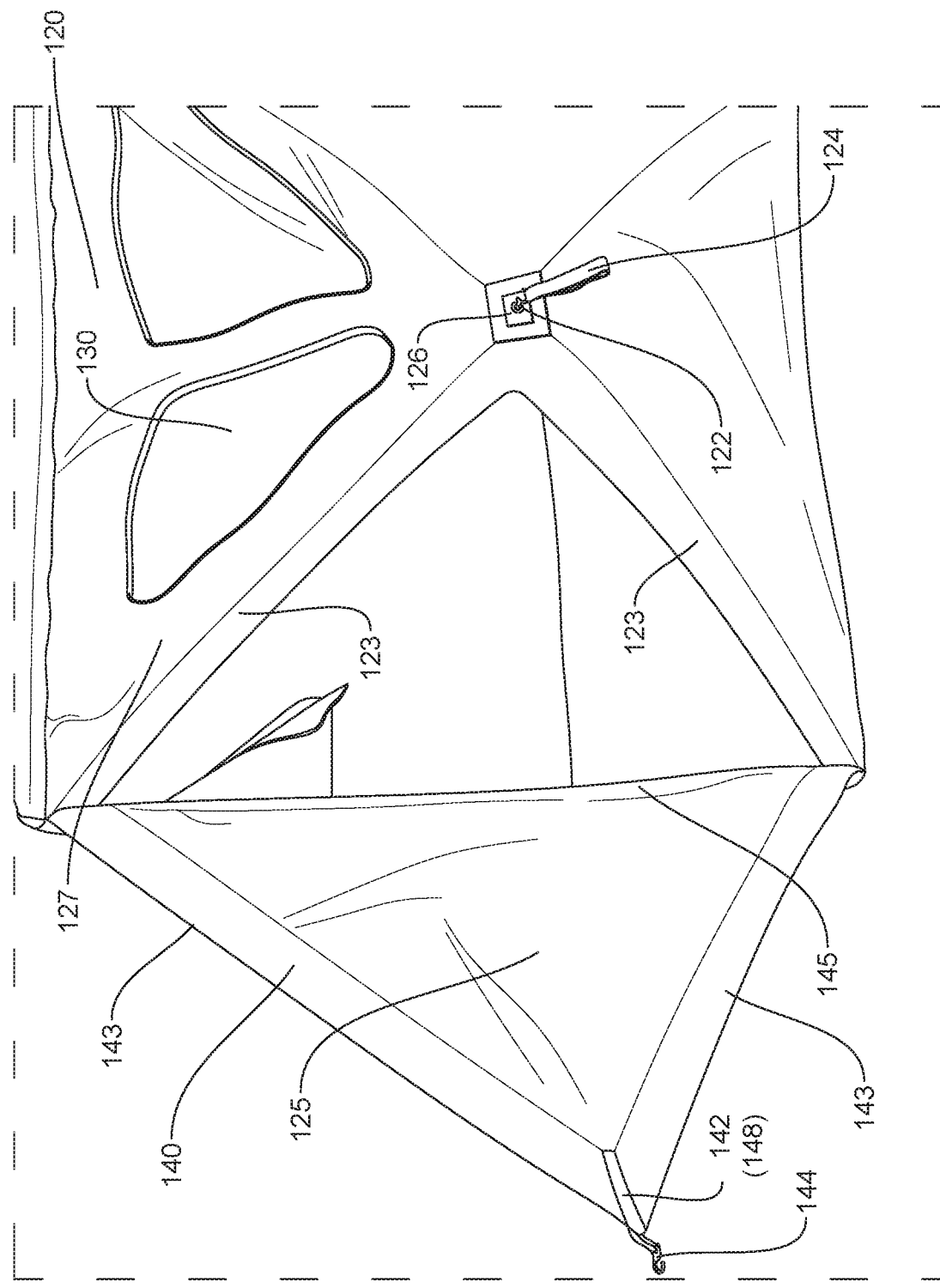
FIG. 4 shows an enlarged view of a portion of the enclosure of FIG. 1 with an example of a door in an open configuration.

FIGS. 3 and 4 show enlarged views of portions of the enclosure 100, with FIG. 3 showing the enclosure 100 with the door 140 in a closed configuration, and FIG. 4 showing the enclosure 100 with the door 140 in an open configuration.

Referring to FIGS. 3 and 4, the enclosure 100 may include a living hinge 145, which may be formed between the door 140 and a wall panel 120. As seen in the non-limiting embodiment shown in FIGS. 3 and 4, the living hinge 145 may be formed along a third edge of the door 140, with the two other edges of the door 140 comprising stiffening members 143. All of the stiff edges 143 may be configured to fold in and parallel with, for example, poles (not shown) when the enclosure is folded up to be put away.

Alternatively, the living hinge 145 may be formed between the door 140 and a roof panel 110 or the floor (not shown).

FIG. 3 shows an enlarged view of the door 140 in a closed configuration. As seen, the door 140 may be configured to lie flat against the enclosure 100 when positioned in the closed configuration. The door 140 may be configured to arch as needed for a tight secure fit.

As seen in FIG. 4, the open door 140 may be constructed to be rigid along one or more of the door edges. Also, the door opening formed in the enclosure 100 (e.g., in a wall panel 120) may include one or more stiffening members 123 that may be positioned proximate to the location of corresponding one or more stiffening members 143 in the door 140, such that door 140 may lay flat against the enclosure 100 to form a seal. The stiffening member(s) 123 may be substantially the same as the stiffening member(s) 143), except where the stiffening member 143 comprises a magnetic material, in which instance the stiffening member 123 may include a ferromagnetic material that attracts the magnetic material in the stiffening member 143. The stiffening member(s) 123 may be covered by the outer material 127 and/or embedded between the inner material 125 and the outer material 127 (shown in FIG. 4).

The enclosure 100 is configured such that it may be folded down to a storage size and shape. The silent door entry is constructed to fold up with the enclosure 100, including the two rigid stiffening members 123 on the enclosure 100, and the two rigid door stiffening members 143, all of which may be folded appropriately to lay vertically with enclosure pole structures (not shown).

Referring to FIG. 4, the door 140 may include a horizontal living hinge 148 that allows the stiffened edges 143 of the door 140 to be folded with respect to each other at the living hinge 148. The living hinge 145 may include a vertical living hinge, which may be formed between the door 140 and enclosure 100. The horizontal living hinge 148 allows the door 140 to fold with the poles (not shown) as the enclosure folds down. The vertical living hinge 145 may comprise a door material that is sewn to the enclosure 100 (e.g., the wall panel 120), or integrally formed with the door 140 and/or enclosure 100, creating a vertical living hinge that can be folded. The door 140 can be made with the same material as the enclosure 100 and formed with the enclosure 100, or affixed to the enclosure 100, in which case it can be made of a different material. The door 140 may be configured to pivot about the living hinge 145 between an open and a closed position or configuration. Either option may be included to create a living hinge 145 for a silent door 140.

The wall panel 120 may include a horizontal living hinge (not shown) that allows the stiffened edges 123 of the wall panel 120 to be folded with respect to each other at the living hinge.

The enclosure 100 may comprise the enclosure described in U.S. patent application Ser. No. 15/686,253, filed Aug. 25, 2017, titled "Outdoor Enclosure with Natural Visual Characteristics," which is incorporated herein by reference in its entirety. The enclosure 100 may include an outer material 127 that differs from or is substantially the same an inner material 125 (shown in FIG. 4). The outer material 127 and inner material 125 may include, for example, the outer layer and inner layer, respectively, as described in the U.S. patent application Ser. No. 15/686,253.

The terms "including," "comprising," and variations thereof, as used in this disclosure, mean "including, but not limited to," unless expressly specified otherwise.

The terms "a," "an," and "the," as used in this disclosure, means "one or more," unless expressly specified otherwise.

The term "attachment mechanism," as used in this disclosure, means an adhesive, a stitching, a button, a rivet, a hook-and-loop fastener, or any other device, composition, or mechanism practicable for the purposes intended herein, as understood by those skilled in the pertinent art.

The term "living hinge," as used in this disclosure, means one or more members that may be made from the same or a different material as the enclosure panel(s) that it connects. The one or more members can include one or more rigid pieces, which can be thinned, cut, or otherwise configured to bend along a line of the hinge. The one or more members can include one or more contiguous flexible pieces that bend along the line of the hinge. The one or more members can be stitched or sewn together or to the enclosure panel. The living hinge can include one or more pieces of material such as fabric that are sewn, stitched, glued, or otherwise fastened to each other or to the enclosure panel(s). The living hinge can include a zipper, a hook-and-loop fastener, or the like. The living hinge can be configured to fold perpendicular to its longitudinal axis, such that the hinge can be folded perpendicular to the line of the hinge.

When a single structure or article is described herein, it will be readily apparent that more than one device or article may be used in place of a single device or article. Similarly, where more than one device or article is described herein, it will be readily apparent that a single structure or article may be used in place of the more than one structure or article. The functionality or the features of a structure or article may be alternatively embodied by one or more other structures or articles that are not explicitly described as having such functionality or features.

While the disclosure has been described in terms of exemplary embodiments, those skilled in the art will recognize that the disclosure can be practiced with modifications in the spirit and scope of the instant disclosure. These examples given above are merely illustrative and are not meant to be an exhaustive list of all possible designs, embodiments, applications or modifications of the disclosure.

What is claimed is:

1. A deployable enclosure that deploys to form a space, the deployable enclosure comprising:
   a plurality of wall panels, including a wall panel having a hub and a plurality of poles;
   an opening in a portion of said wall panel, the opening allowing access to the space formed by the enclosure;
   a door that covers the opening, the door having a pair of rigid edges and a horizontal living hinge;
   a fastener device comprising a door attachment portion and an attachment member; and
   a vertical living hinge that attaches the door to the enclosure,
   wherein said wall panel includes at least one stiffening member positioned proximate a location of a corresponding one of the pair of rigid edges in the door such that the door lays flat against the enclosure to form a seal, and
   wherein said pair of rigid edges in the door are configured to fold parallel with at least two of the plurality of poles when the enclosure is folded.

2. The enclosure of claim 1, wherein the door comprises a plurality of stiffening members that form the pair of rigid edges.

3. The enclosure of claim 1, wherein the at least one stiffening member is located proximate to the opening.

4. The enclosure of claim 2, wherein said wall panel includes a plurality of stiffening members and the pair of rigid edges in the door are positioned to substantially align with the plurality of stiffening members in said wall panel to cover the opening and form the seal between the door and said wall panel when the door is in a closed position.

5. An enclosure that forms a space, the enclosure comprising:
   a plurality of wall panels;
   an opening that allows access to the space formed by the enclosure;
   a door that covers the opening, wherein the door includes a rigid edge;
   a fastener device that secures the door to one of the plurality of wall panels; and
   a vertical living hinge that attaches the door to a portion of one of the plurality of wall panels,
   wherein the fastener device comprises a hook device and a receiver device, and
   wherein the hook device comprises a door attachment portion and an attachment member.

6. The enclosure of claim 5, wherein the door includes a pair of rigid edges.

7. The enclosure of claim 6, further comprising:
   a horizontal living hinge that allows the pair of rigid edges to fold with respect to each other.

8. The enclosure of claim 6, further comprising:
   a plurality of stiffening members in a wall panel, each of the plurality of stiffening members being located proximate to the opening; and
   a plurality of stiffening members in the door that form the pair of rigid edges.

9. The enclosure of claim 8, wherein the plurality of stiffening members in the door are positioned to substantially align with the plurality of stiffening members in the wall panel to cover the opening and form a seal between the door and the wall panel when the door is in a closed configuration.

10. The enclosure of claim 5, wherein the door comprises a stiffening member to form the rigid edge.

11. The enclosure of claim 5, further comprising:
    a stiffening member in a wall panel, wherein the stiffening member is located proximate to the opening.

12. The enclosure of claim 5, wherein the fastener device secures the door to said one of the plurality of wall panels in a closed position.

13. The enclosure of claim 5, wherein the hook device attaches and secures to the receiver device to secure the door to said one of the plurality of wall panels.

14. The enclosure of claim 5, wherein the door attachment portion comprises a horizontal living hinge.

15. The enclosure of claim 5, wherein the attachment member comprises:
    a hook portion that attaches and secures to the receiver device.

16. A silent door for covering an opening in an enclosure that allows access to a space formed by the enclosure, the silent door comprising:
    a pair of rigid edges;
    a vertical living hinge that attaches the door to a portion of the enclosure;
    a horizontal living hinge that allows the pair of rigid edges to fold with respect to each other; and
    a fastener device comprising a door attachment portion and an attachment member,
    wherein the opening in the enclosure is formed in a portion of a wall panel that includes a hub, a plurality of poles and at least one stiffening member positioned such that when the silent door lays flat against the enclosure the at least one stiffening member is located proximate to a corresponding one of the pair of rigid edges to form a seal, and
    wherein said pair of rigid edges are configured to fold parallel with at least two of the plurality of poles when the enclosure is folded.

17. The door of claim 16, further comprising:
    a hook device that attaches to a receiver device located on a wall panel in the enclosure.

18. The enclosure of claim 16, wherein the fastener device comprises:
    a hook device; and
    a receiver device.

19. The enclosure of claim 18, wherein the hook device comprises the door attachment portion.

20. The enclosure of claim 18, wherein the hook device comprises the attachment member.

* * * * *